United States Patent [19]

Bellanger et al.

[11] 4,101,738
[45] Jul. 18, 1978

[54] ARRANGEMENT FOR PROCESSING AUXILIARY SIGNALS IN A FREQUENCY MULTIPLEX TRANSMISSION SYSTEM

[75] Inventors: Maurice Georges Bellanger, Antony; Georges Bonnerot, Orsay; Michel Coudreuse, Paris, all of France

[73] Assignee: Telecommunications Radioelectriques et Telephoniques T.R.T., Paris, France

[21] Appl. No.: 697,357

[22] Filed: Jun. 18, 1976

[30] Foreign Application Priority Data

Jun. 24, 1975 [FR] France .................................. 75 19717

[51] Int. Cl.$^2$ ................................................. H04J 1/14
[52] U.S. Cl. ................................ 179/15 FD; 364/724; 364/726
[58] Field of Search ......... 179/15 FD, 15 FS, 15 BC, 179/15 BP, 15 BY; 235/152

[56] References Cited

U.S. PATENT DOCUMENTS

| | | | |
|---|---|---|---|
| 3,605,019 | 9/1971 | Cutter | 179/15 FD |
| 3,808,412 | 4/1974 | Smith | 179/15 BC |
| 3,891,803 | 6/1975 | Daguet | 179/15 FS |
| 3,971,922 | 7/1976 | Bellanger | 179/15 FS |

*Primary Examiner*—Kathleen H. Claffy
*Assistant Examiner*—Joseph A. Popek
*Attorney, Agent, or Firm*—Frank R. Trifari; Henry I. Steckler

[57] ABSTRACT

A circuit for converting into an FDM format spatially separated signalling signals and pilot signals, comprises a digital filter bank for converting the signals into the FDM format. A receiver for separating the signalling signals and pilot signals from the FDM signal comprises another digital filter bank for producing baseband signals. These filter banks have a transfer characteristic formed by a number of passband curves which are derived from the characteristic of a selected low-pass filter.

13 Claims, 11 Drawing Figures

ARRANGEMENT FOR PROCESSING AUXILIARY SIGNALS IN A FREQUENCY MULTIPLEX TRANSMISSION SYSTEM

BACKGROUND OF THE INVENTION

1. Field of the Invention

The invention relates to an arrangement for processing auxiliary signals in the form of spatially separated signalling signals and pilot signals for a given number of main information signals for transmitting these auxiliary signals together with the main information signals in an FDM format.

The invention also relates to an arrangement for processing auxiliary signals of a given number of main information signals, for spatially separating and recovering these auxiliary signals in the form of signalling signals and pilot signals, which are applied to the arrangement together with the main information signals in an FDM format.

2. Description of the Prior Art

As known, an FDM signal for speech signals is composed of a plurality of FDM channels which each cover a bandwidth of 4 KHz. Each of these channels accommodates a speech channel for the transmission of a speech signal. Herein this speech signal has a bandwidth of 3.1 kHz and the distance between two successive speech channels in the FDM signal is 900 Hz. The frequency spaces of 900 Hz which are each time present between two successive speech channels are utilized for transmitting signalling signals and, possibly, pilot signals. More in particular an auxiliary channel is added to each speech channel for transmitting the signalling signals associated with this speech channel. It should be noted that the bandwidth of such signalling signals is only a few tens of hertz (for example 20 Hz).

The location described above of the signalling signals with respect to the associated speech signal is also indicated by out of band signalling. This in contrast with the so-called in-band signalling in which the signalling signals are located within the frequency band of the speech signal.

The signalling signals used in practice are all in the form of a series of pulses having a repetition frequency of, for example, 10 Hz. To accommodate these signals in the auxiliary channels of the FDM signal each of these signalling signals is filtered by means of a low-pass filter and thereafter modulated on a carrier of a suitably chosen frequency. In the reverse case, to separate the signalling signals spatially again from the FDM signal and to obtain the signalling signals in base band, the FDM signal is applied to a plurality of parallel channels. In each of these channels the FDM signal is demodulated with a carrier of a suitably chosen frequency. From each of the demodulated signals obtained in this way a signalling signal is again selected by means of a low-pass filter. For the proper operation of both arrangements the cut-off frequencies of the low-pass filters used must be low, for example 50 Hz. However, this results in very bulky and expensive filters.

With an FDM signal one or more pilot signals are also transmitted together with the signalling signals. For a primary FDM group which is located in the frequency band of 60 – 108 kHz one or more pilot signals are accommodated with the frequencies 84.080 kHz, 84.140 kHz or 104.80 kHz respectively. At the receiver side of the FDM transmission system the level of such a pilot signal is used for automatic volume control of the speech signals. In view of the accuracy which is required for this volume control both the frequency and the amplitudes of these pilot signals must be very stable whilst at the receiving side of the FDM transmission system extremely selective filters must be used to select these pilot signals from the FDM signal. Such a filter has, for example, a bandwidth of 20 Hz, whereas its intermediate frequency coincides with the pilot frequency. In practice quartz oscillators are used for producing the pilot signals whilst very expensive quartz filters are used for selecting the pilot signals from the FDM signal.

In practice the above means that approximately 40% of the costs of an FDM multiplexer or demultiplexer is determined by the necessary transmission of signalling signals and pilot signals.

SUMMARY OF THE INVENTION

It is an object of the present invention to provide another concept of the arrangements described above with which a considerable cost reduction is obtained.

It is also an object of the present invention to provide arrangements of the kind defined above which can be fully constructed in digital techniques.

The arrangement for processing spatially separated auxiliary signals in the form of spatially separated signalling signals for a given number of main information signals for transmitting these auxiliary signals together with the main information signals in an FDM format, and which comprises a plurality of input circuits which is equal to the plurality of main information signals and with an output circuit further comprises, according to the invention:

means for digitizing the auxiliary signals;

means which are coupled to said digitizing means for limiting the bandwidth of each of the auxiliary signals;

a digital filter bank to which said digital auxiliary signals are applied and which has a passband characteristic which is characteristic for each of the auxiliary signals, the intermediate frequency of this passband characteristic coinciding with the intermediate frequency of the auxiliary channel for the relevant auxiliary signal.

The arrangement for processing auxiliary signals in the form of signalling signals of a given number of main information signals, for spatially separating and recovering these signalling signals which are offered together with the main information signals in an FDM format, and which comprises an input circuit to which said FDM signal is applied and a plurality of output circuits which is equal to the plurality of main information signals further comprises according to the invention:

means for digitizing the FDM signal a first digital filter bank to which said digitized FDM signal is applied and which has a band-pass characteristic which is characteristic for each of the signalling signals, the intermediate frequency of one of the passbands coinciding with the intermediate frequency of the relevant auxiliary channel;

a second digital filter bank to which the digital output signals of the first digital filter bank are applied and which has a low-pass characteristic for each of the auxiliary signals.

In what follows hereinafter the said first arrangement which is arranged for converting the spatially separated signalling signals in an FDM format will be indicated by FDM modulation arrangements. The second arrangement which is arranged for recovering and spatially separating signalling signals offered in an FDM format will be indicated by FDM demodulation arrangement.

In one embodiment, in the FDM modulation arrangement, the sampling frequency of the auxiliary signals is equal to the channel signal bandwidth of 4 kHz. Furthermore the digital filter banks are mainly constituted in the FDM modulation and demodulation arrangements by the cascade circuit of a discrete Fourier transformer and a polyphase network. In this embodiment the computing speed in all computing devices is equal to 4 kHz.

In another embodiment the computing speed in a large part of the computing arrangements is considerably reduced because the auxiliary signals are sampled with a considerably lower sampling frequency (for example, with, 500 Hz). To increase the sampling frequency an interpolating digital filter is included in the FDM modulation arrangement between each of the polyphase networks and the associated output of the Fourier transformer. In the FDM demodulation arrangement a decimation filter is included between each polyphase network and the associated input of the Fourier transformer to reduce the sampling frequency. In this embodiment the Fourier transformers operate at a lower computing speed and, consequently, also the second digital filter bank.

SHORT DESCRIPTION OF THE FIGURES

The FIGS. 1 and 2 show an FDM modulation arrangement and an FDM demodulation arrangement according to the invention respectively;

FIG. 3 shows the spectrum of the multiplex signal for a primary group of 12 telephone signals.

In FIG. 4 diagram 4a shows the attenuation characteristic of a lowpass filter and the diagrams 4b to 4f inclusive show various attenuation characteristics of bandpass filters which together constitute the transmission characteristic of a digital filter bank, the diagram 4g shows the spectrum of the multiplexed auxiliary signals.

In FIG. 5 the diagram 5a shows the spectrum of the signal at the output of the digital filter bank in the FDM demodulation arrangement and diagram 5b shows the characteristic of the filter for selecting the signalling signals. Diagram 5c shows the characteristic of the filter for selecting a pilot signal.

FIG. 6 shows an embodiment of a digital phase shifter,

FIGS. 7 and 8 respectively show another embodiment of the FDM modulation and demodulation arrangement according to the invention.

The FIGS. 9a and 9b show a pulse of a signalling signal and a filtered version of this pulse respectively:

FIG. 10 shows an embodiment of a control device and a store utilized in FIG. 7.

DESCRIPTION OF THE EMBODIMENTS

Figure 1:
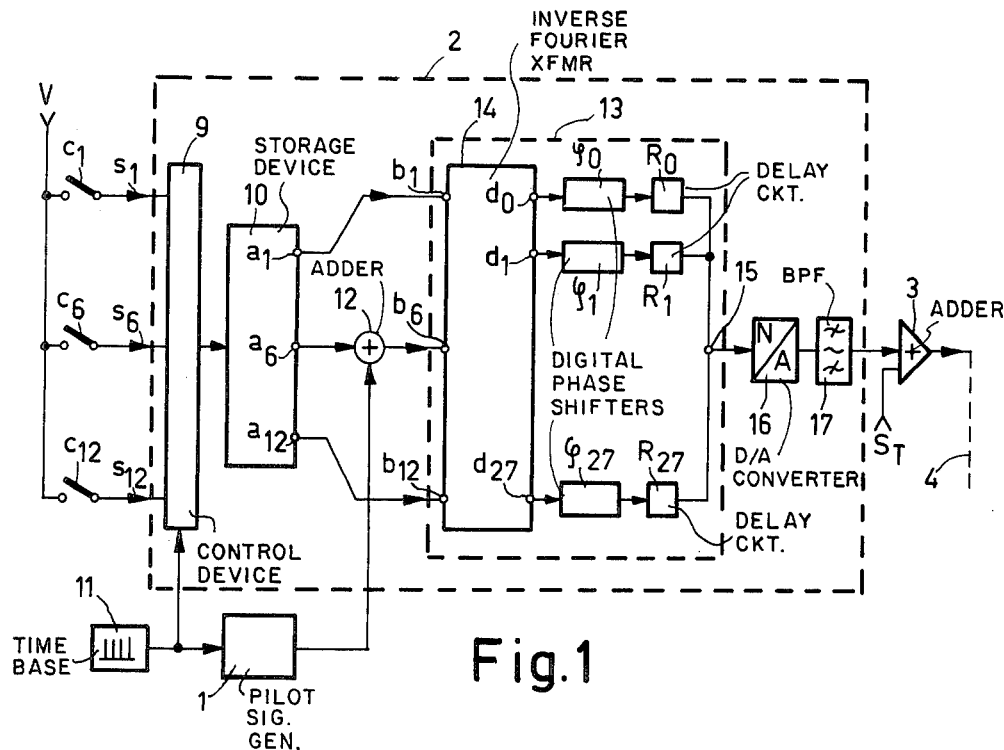

FIG. 1 shows an FDM modulation arrangement according to the invention. This arrangement is arranged for transmitting control and signalling auxiliary signals which are added to a group of telephone signals to be transmitted in frequency division multiplex. Here below it is assumed that the FDM signal is constituted by a primary group of 12 telephone signals.

Figure 3:
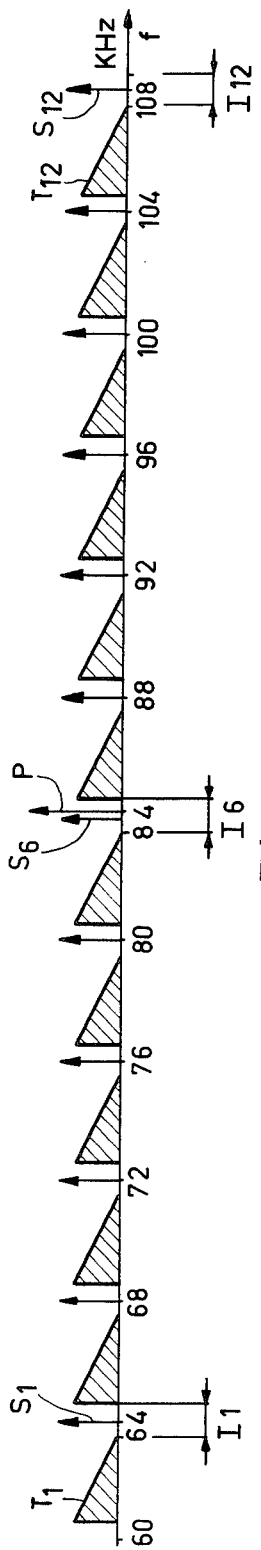

The spectrum of such a primary group is shown in FIG. 3. This spectrum comprises the speech channels $T_1$ to $T_{12}$ inclusive, which correspond to the 12 telephone signals and which each occupy a frequency band having a width of 3100 Hz. These speech channels are each time situated between the multiples of 4 kHz in the frequency band from 60 - 108 kHz. The intervals $I_1$ to $I_{12}$ inclusive, having a width of 900 Hz which are situated outside the speech channels are used as transmission channels for the auxiliary signals.

The signalling signals belong to these auxiliary signals. These signalling signals are logic signals having a frequency of 10 Hz which are each associated with a channel signal for controlling the communication in this channel. To be able to introduce the signalling signals in the intervals between speech channels the bandwidth of each of these signalling signals is limited to some tens of Hz, whereafter the signals thus limited are modulated on a carrier. In, for example, the so-called dc signalling systems carrier frequencies are used which are in the frequency band of 64–108 kHz and which are each a multiple of 4 kHz. These carrier frequencies have been indicated in FIG. 3 by means of the solid arrows $S_1$ to $S_{12}$ inclusive.

Added to a group of channel signals are also one or more control signals in the form of pilot signals having a very stable frequency and a very stable amplitude. This amplitude is used in the FDM demodulation arrangement for the automatic control of the speech channel level. A pilot signal having a frequency of 84.140 Hz is used in a primary group of 12 channel signals with d.c. signalling. In FIG. 3 this pilot signal is indicated by means of the solid arrow P. From FIG. 3 it appears that a signalling signal and a pilot signal is present in the interval $I_6$ which is situated around the frequency of 84 kHz.

In FIG. 1 the sources for logic signalling signals are represented by contacts $C_1$ to $C_{12}$ inclusive which are fed by a d.c. voltage V and which are operated with a frequency of 10 Hz by means not further shown in the Figure. Reference numeral 1 indicates a pilot signal generator. The circuit 2 which performs filter and carrier modulation operations on the control and signalling signals supplies the auxiliary signals in an FDM format which, in an amplifier-adder 3 is superimposed on the multiplex signal formed by the speech signals $S_T$, which multiplex signal is assumed to have been formed by means not shown in the Figure. The complete multiplex signal of the speech channels thus formed and the auxiliary signals are transmitted through the lead 4.

Figure 2:
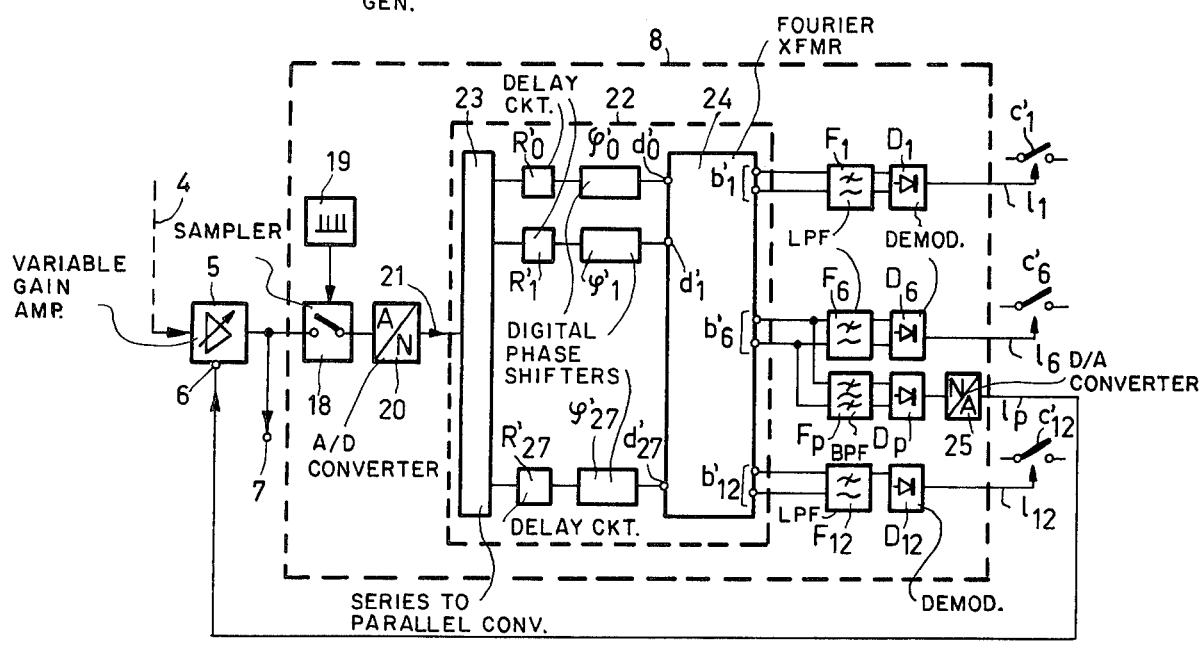

The FDM demodulation arrangement of FIG. 2 is provided with an amplifier 5 to which the FDM signal which is transmitted through the lead 4 is applied. This amplifier 5 has a variable gain factor and is controlled by the received pilot signal which is applied to the control terminal 6 of this amplifier. The FDM signal which is produced at the output of the amplifier 5 is applied to the terminal 7 for spatially separating the speech channels in a manner which is not further indicated in FIG. 2. This FDM signal is also applied to a circuit 8 in which the demodulation and filtering processes are performed for spatially separating the received auxiliary signals. The signalling signals are derived from the leads $l_1$ to $l_{12}$ respectively and are used for actuating the contacts $C'_1$ to $C'_{12}$ inclusive which correspond to the contacts $C_1$ to $C_{12}$ of FIG. 1. The transmitted pilot signal is derived from the lead $l_p$ for supply to the control terminal 7 of the amplifier 6.

At present, in frequency multiplex transmission systems the filtering and modulation processes and the demodulation and filtering processes for the auxiliary signals are still performed by means of analog signal processing techniques. As has already been indicated these arrangements are consequently bulky and expensive. By means of the arrangement according to the invention it is possibly to mitigate these drawbacks to a considerable extent.

The FDM modulation arrangement according to the invention (FIG. 1) comprises to that end means for producing digital signals which correspond to the base band auxiliary signals.

As regards the signalling signals these means are constituted by a control device 9 and a storage device 10. The signalling signals $s_1$ to $s_{12}$ inclusive are applied to the control device 9. As remarked above these signalling signals are formed by series of pulses which occur with a frequency of 10 Hz. To introduce these signals in the intervals between the speech channels these signals must be filtered in order to limit their bandwidth to some tens of Hz. This might be effected by digital low-pass filters having a suitably chosen impulse response. In FIG. 1 this filtering process is performed in a simpler manner. The samples of the step response of the required low-pass filter are stored in digital form in the storage device 10. In response to each of the signalling pulses, samples of the step response are read from the storage device 10 by the control device 9 in a manner which will be further explained with reference to FIG. 9. In particular, in response to a signalling pulse at the input $S_1$ of the control device a series of samples is produced at the output $a_1$ of the storage device 10, in response to a signalling pulse at the input $S_6$ a series of samples is produced at the output $a_6$ etc. The frequency with which the samples of the step response occur at, for example, the output $a_1$ of the storage device 10 is determined by the time base 11.

The pilot signal which must be inserted into accommodated the FDM signal and which has, for example, a frequency of 84.140 Hz is generated by processing a base band pilot signal $s_p$ having a frequency of 140 Hz. This signal is produced in digital form by the generator 1. This generator is, for example, constituted by a ROM, in which the samples of a sinusoidal signal having a frequency of 140 Hz are stored in digital form. These samples are applied to the output of the memory with a frequency which is determined by the time base 11.

To insert this pilot signal into the FDM signal the arrangement of FIG. 1 further comprises an adder circuit 12 an input of which is connected to the output $a_6$ of the storage device 10 and whose other input is connected to the output of the storage device 1. The signalling $s_6$ and the pilot signal $s_p$ are auxiliary signals which must be transmitted in the same channel. In particular these signals are transmitted in the interval $I_6$ of FIG. 3. Consequently the digital signal $s_6 + s_p$ occurs at the output of the adder 12.

The FDM modulation arrangement of FIG. 1 further comprises a digital filter bank 13 for converting the auxiliary signals into the FDM format. In particular the 12 intervals $I_1 \ldots I_{12}$ of FIG. 3 contain the digital signals $s_1, \ldots, s_6 + s_p, s_{12}$ respectively. The filter bank 13 has a transfer characteristic which is formed by bandpass characteristics whose intermediate frequencies coincide with the intermediate frequencies of the auxiliary channels which accommodate the auxiliary signals. These characteristics are derived from the characteristic of a low-pass filter which ensures the transmission of the auxiliary signals in the base band.

Figure 4:
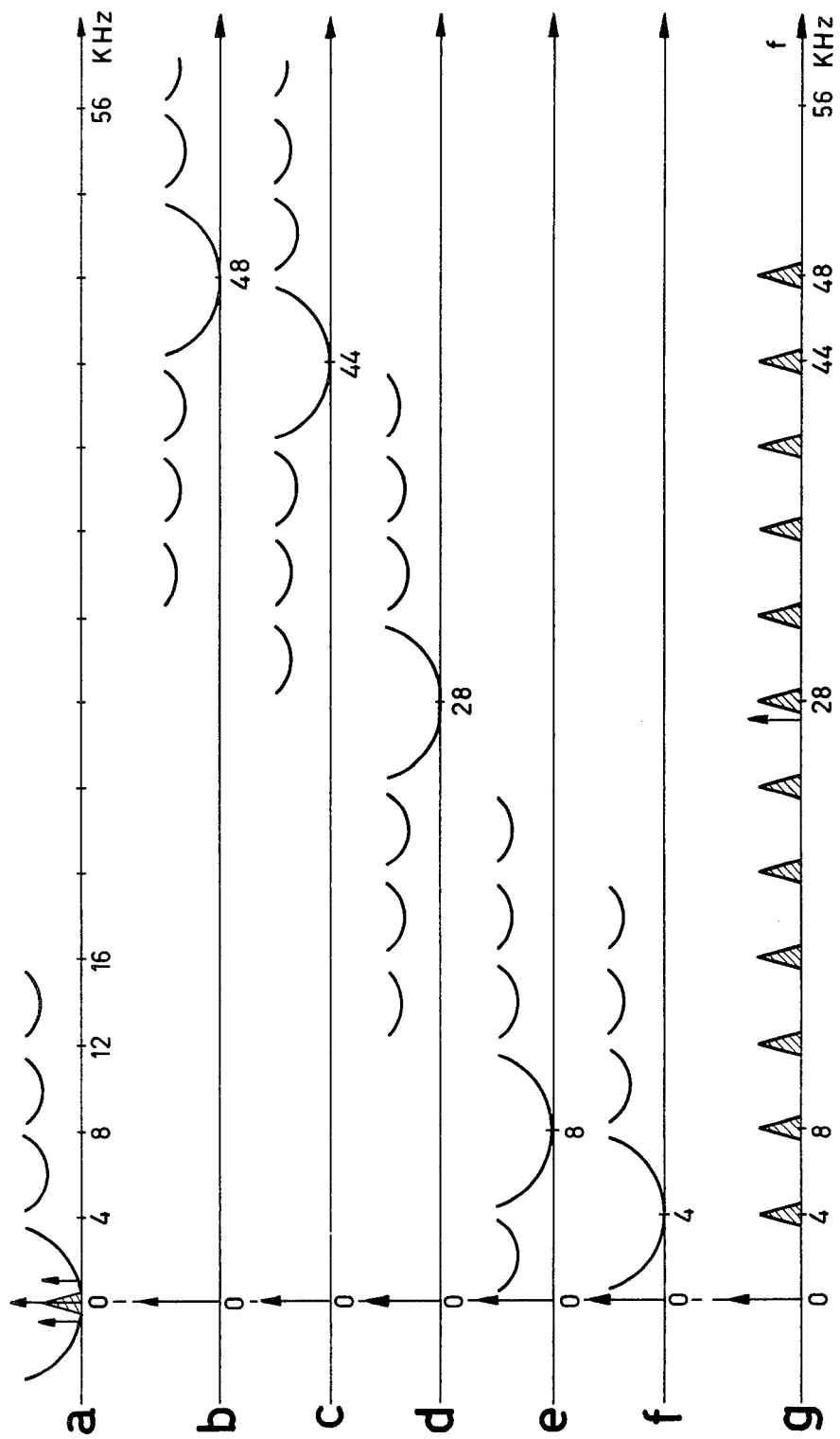

Diagram 4a of FIG. 4 shows the attenuation characteristic of this low-pass filter. It appears from this characteristic that around the frequency 0 a very slight attenuation is exercised on a signalling signal. This signalling signal, having a bandwidth of, for example, 50 Hz is represented in this diagram 4a by means of hatched triangle. In this diagram 4a also the two base band pilot signals having respectively the frequencies ± 140 Hz are indicated by two arrows. As this diagram 4a shows the attenuation curve of the filter is infinitely high for all multiples of 4 kHz.

The attenuation curve of the various bandpass characteristics of the filter bank 13 is shown in the diagrams 4b to 4f inclusive. The characteristics of the diagrams 4b, 4c, ... 4d, ... 4e, 4f are obtained from the characteristic 4a by shifts over 12 × 4 kHz, 11 × 4 kHz, ... 7 × 4 kHz, ... 2 × 4 kHz, 1 × 3 kHz.

In the embodiment of FIG. 1 the sampling frequency of the signals applied to the filter bank 13 is equal to 4 kHz and this filter bank is realized in the manner as extensively described in U.S. Pat. No. 3,891,803 and U.S. Pat. No. 3,971,922. In particular the 12 digital signals $s_1, \ldots s_6 + s_p \ldots s_{12}$ are applied to inputs $b_1$ to $b_{12}$ inclusive of an inverse discrete Fourier transformer 14. This Fourier transformer 14 is provided with 28 real outputs $d_0$ to $d_{27}$ inclusive and the digital signals at these outputs are applied to the 28 branches of a polyphase network. Each branch comprises in cascade a digital phase shifter $\varphi_0, \varphi_1 \ldots \varphi_{27}$, and a delay circuit $R_0, R_1, \ldots R_{27}$. These delay circuits $R_0, R_1 \ldots R_{27}$ introduces a delay of 0, (27/28) T, ... (1/28) T = (1/4) kHz respectively. The digital phase shifters $\varphi_0, \varphi_1 \ldots \varphi_{27}$ have a phase-frequency characteristic having a "saw-toothed" shape, whose slopes are equal in absolute value but are of opposite direction to the phase-frequency characteristics of the delay circuits $R_0, R_1, \ldots R_{27}$, which are connected in cascade to these phase shifters. All digital phase shifters have the same amplitude-frequency characteristic which is equal to the amplitude-frequency characteristic of the baseband filter shown in diagram 4a. The outputs of the 28 branches of the polyphase network are connected to the output lead 15 of the digital filter bank 13. As explained in detail in the above-mentioned patents a multiplex signal is obtained in digital form at the output 15 which signal may be considered as having been produced by sampling each of the 12 digital input signals $S_1, S_2, \ldots S_6 + S_{10}, \ldots s_{11}, s_{12}$, with a frequency of 4 kHz, thereafter by digital filtering of this digital signal by means of a digital filter having a cut-off frequency of approximately 50 Hz and thereafter selecting those spectrum repetitions which have the desired location. This selection may be considered as the filtering action with the characteristics 4b, 4c, ... 4e, 4f shown in FIG. 4. In this manner a multiplex signal is obtained which has a sampling frequency of 4 × 28 = 112 kHz. The spectrum of this multiplex signal located in the band from frequency 0 to half the sampling frequency 56 kHz, is shown in diagram 4g. It comprises the spectra of the 12 signalling signals $s_1$ to $s_{12}$ inclusive around the 12 frequencies which are each a multiple of 4 kHz and a pilot signal at the frequency 28 kHz − 140 Hz.

The output signal of the polyphase network 13 can now be converted in a simple manner into an FDM signal of the usual construction. To this end this digital FDM signal is converted into an analog signal by means of the digital-to-analog converter 16. As known the spectrum of this signal consists of the original spectrum and repetitions of this spectrum at multiples of the sampling frequency of 112 kHz. By means of the bandpass filter 17 the band from 64–108 kHz is selected. Now this band comprises the spectra of the 12 signalling signals in a sequence which is the reverse of that of the diagram 4g and the pilot signal having the desired frequency of 84.140 kHz as indicated in FIG. 3.

The FDM demodulation arrangement shown in FIG. 2 comprises the circuit 8 for spatially separating and recovering the auxiliary signals which are applied to the demodulation arrangement in an FDM format. This circuit 8 comprises a sampling device 18 which, under the control of a local clock 19 which produces sampling pulses having a frequency of 112 kHz samples the multiplex signal. It should be noted that the multiplex signal applied to the sampling device 18 comprises both the speech channels and the auxiliary channels. The sampled signal is converted into a digital signal by means of the analog-to-digital converter 20. Via the input lead 21 this digital signal is applied to the digital filter bank 22 for separating the 12 auxiliary channels. This filter bank is again constructed in the manner as extensively described in the above-mentioned U.S. Patents and comprises elements whose operation is the inverse of the operation of the filter bank 13 of the FDM modulation arrangement. This filter bank 22 comprises a series-to-parallel converter 23 with 28 outputs which produces at each output digital signals whose code words occur with 4 kHz. These outputs are connected to the 28 branches of a polyphase network. Each branch comprises in cascade a delay circuit $R'_0, R'_1 \ldots R'_{27}$ having delay times of 0, (1/28) T, ... (27/28) T respectively where T = (1/4 kHz) and a digital phase filter $\varphi'_0, \varphi'_1 \ldots \varphi'_{27}$ each having a phase-frequency characteristic having a "saw-toothed" shape. Also here the slope of a phase-frequency characteristic is equal in absolute value but is of opposite sign as regards the phase-frequency characteristic of the associated delay circuits $R'_0, R'_1$ or $R'_{27}$. All these digital phase shifters have the same amplitude-frequency characteristic which is again equal to the amplitude-frequency characteristic of the baseband filter shown in diagram 4a. The signals at the output of the phase shifters $\varphi'_0$ to $\varphi'_{27}$ respectively are fed to the inputs $d'_0$ to $d'_{27}$ respectively of a discrete Fourier transformer 24 which comprises 12 complex pairs of outputs which are indicated by $b'_1$ to $b'_{12}$ respectively.

As extensively explained in the above-mentioned patents the output signals which are procuced at the outputs $b'_1$ to $b'_{12}$ respectively of the Fourier transformer 24 may be considered as having been obtained by filtering the multiplex signal with filters whose passband characteristics are shown in the diagrams 4b to 4f respectively and by thereafter demodulating these signals to the base band. Now these base band signals are digital signals which are sampled with a frequency of 4 kHz.

It should be noted that although real auxiliary signals are applied to the inputs $b_1$ to $b_{12}$ inclusive of the Fourier transformer 14 of the FDM modulation arrangement, the Fourier transformer 24 of the FDM demodulation arrangement produces complex signals. This is necessary, because the transmitting medium introduces phase shifts which are not equal for all signals.

Figure 5:
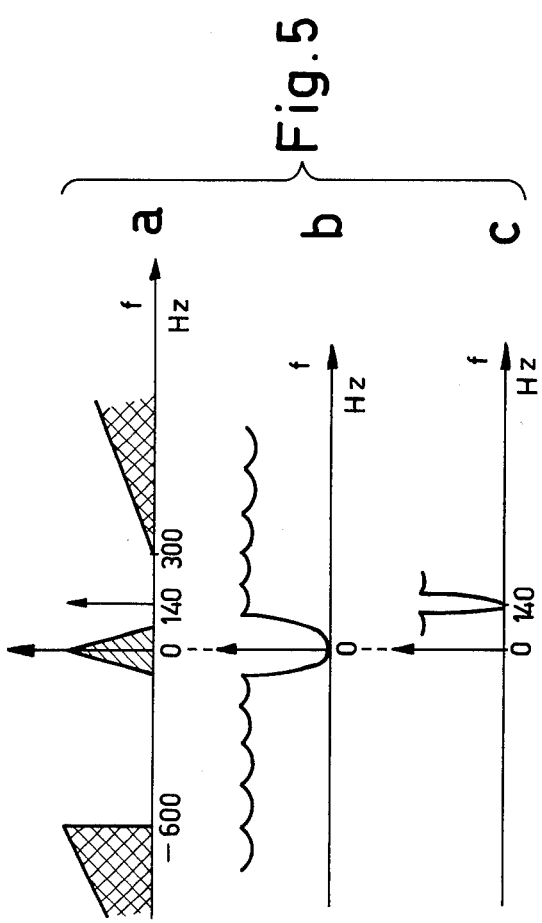

The spectrum of the signals which are occur in digital form at the various outputs of the Fourier transformer 24 is shown in the diagram 5a of FIG. 5 around the zero frequency. For all outputs $b'_1$ to $b'_{12}$ inclusive this spectrum comprises the spectrum of a signalling signal which is represented by the hatched triangle which is situated around the zero frequency and the spectrum of the speech signals of the adjacent channels. These speech signals are not appreciably attenuated by the filtering action which is not so severe in the filter bank 22. For this filtering action is performed with the characteristic, shown in diagram 4a of the base band filter and mainly serves to separate auxiliary channels. The spectrum of the telephone signals is represented by the two double hatched portions which extend to above the frequency of 3000 Hz for the uppermost telephone channel and to below the frequency of −600 Hz for the bottommost telephone channel. The spectrum of the signal at the output $b'_6$ furthermore comprises a pilot signal having a frequency of 140 Hz as shown in FIG. 5a.

To separate the signalling signals from the adjacent speech signals digital low-pass filters $F_1$ to $F_{12}$ respectively are connected to all pairs of outputs $b'_1$ to $b'_{12}$ respectively of the Fourier transformer 24. These filters act on complex signals and are composed of two filter cells which in the Figured. are not depicted as two separate cells but which process the real part and the imaginary part of the complex signals respectively. The frequency attenuation characteristic of each cell varies as shown in diagram 5b. Each cell may be realized as a second order filter.

To obtain the pilot signal with the frequency of 140 Hz a bandpass filter $F_p$ is furthermore connected to the pair of outputs $b'_6$ of the Fourier transformer 24. This filter $F_p$ is also constituted by two filter cells, not shown in detail, which again process the real part and the imaginary part of the complex signal respectively at the pair of outputs $b'_6$. The frequency attenuation characteristic of this filter $F_p$ varies as shown in diagram 5c. The passband of this filter centres around 140 Hz and has a bandwidth in the order of 20 Hz.

At the outputs of the signalling filters $F_1$ to $F_{12}$ inclusive complex signals are produced, in digital form, which correspond to the received signalling signals. For actuating the contacts $C'_1$ to $C'_{12}$ inclusive, however, only the amplitudes of these signals are required. To this end the pairs of outputs of the filters $F_1$ to $F_{12}$ are connected to detectors $D_1$ to $D_{12}$ inclusive which each produce as an output signal the modules of the complex output signal of the preceding filter. Such detectors have already been described in an article by Blaser and Braun "Schnelle digitale Amplitudenbildung von Quadraturpaaren" pages 20 to 26 inclusive and which was published in the periodical AGEN-Zurich, No. 17, December 1974. Consequently logic signals are produced at the outputs $l_1$ to $l_{12}$ inclusive of the detectors $D_1$ to $D_{12}$ for controlling the signalling contacts $C'_1$ to $C'_{12}$ inclusive.

As also for controlling the level of the input FDM signal only the amplitude of the pilot signal is used a detector $D_p$ is connected to the output of the pilot filter $F_p$. This detector $D_p$ produces a digital signal which is applied to a digital-to-analog converter 25. The latter applies the control signal to the lead $l_p$ for controlling the gain of the amplifier 5.

The digital system according to the invention for transmitting the auxiliary signals has considerable advantages with respect to the analog systems used so far. So, for example in the FDM modulation arrangement the analog low-pass filters for limiting the bandwidth of the signalling signals are completely eliminated. This filtering function is now realized by means of the storage device 10 in which the coefficients for all signalling signals are stored. The base band pilot signal (140 Hz) is also produced by a storage device 1. Converting the pilot signal into its definite frequency (84.140 Hz) in the multiplex signal is performed simultaneously with converting the signalling signals by means of the digital filter bank 13. In the system described it is extremely simple to use a pilot signal having another frequency than 84.140 kHz. If a pilot signal having a frequency of 84.080 kHz is desired then it is sufficient to replace the coefficients of the storage device 1. To change from the frequency 84.080 kHz to the frequency of 104.840 kHz it suffices to insert the adder 12 at another input ($b_{11}$) of the Fourier transformer 14.

In the FDM demodulation arrangement the use of bulky analog filters for selecting the signalling signals have been avoided whilst furthermore no expensive quartz filters, which are difficult to realize, are needed anymore for selecting the pilot signals. The digital filter processing which is performed to separate the auxiliary signals spatially and to convert them to baseband position can be realized in a simple manner and is performed in two steps. In a first step which is performed in the digital filter bank 22 the auxiliary channels are separated and the signals in these channels are brought in baseband position. In a second step which is performed in the filters $F_1$ to $F_{12}$ inclusive and in the filter $F_p$ the signalling signals are separated from the pilot signals and the speech channels. As these digital filters $F_1$ to $F_{12}$ inclusive and $F_p$ are arranged for processing low frequency signals they are simple to realize. The latter applies particularly to the pilot filter $F_p$ which is centred around 140 Hz and which has a bandwidth of 20 Hz.

Figure 6:
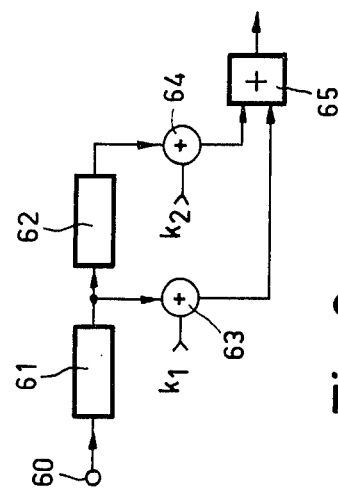

As already remarked before, no stringent requirements are made on the digital filter banks 13 and 22. The digital phase shifters $\varphi'_0$ to $\varphi'_{27}$ inclusive and $\varphi'_0$ to $\varphi'_{27}$ inclusive can therefore be realized in a particularly simple manner. FIG. 6 shows an embodiment of such a phase shifter. This phase shifter is of the conventional non-recursive type in which two coefficients are used. Two delay circuits 61 and 62 are connected, in cascade, to the input 60 of this phase shifter. Multipliers 63 and 64 with the coefficients $k_1$ and $k_2$ are connected to the outputs of 61 and 62, which coefficients correspond to the attenuation characteristic of the phase shifter. The outputs of the multipliers 63, 64 are connected to the inputs of the adder circuit 65 whose output constitutes the output of the phase shifter.

In the FDM modulation arrangements according to the invention described so far, digital signals are applied to the digital filter bank 13 with a sampling frequency of 4 kHz. being the distance between two successive channel signals; in the same manner the digital filter bank 22 of the FDM demodulation arrangement produces digital signals having a sampling frequency of also 4 kHz. Consequently, in these filter banks calculations are performed by all computing devices, such as Fourier transformers 14 and 24 and the phase shifters $\varphi_0$ to $\varphi_{27}$ inclusive, $\varphi'_0$ to $\varphi'_{27}$ inclusive at a rate of 4 kHz. Also in the digital filters $F_1$ to $F_{12}$ inclusive and $F_p$ calculations must consequently be performed at a rate of 4 kHz. As known it is always advantageous when realizing digital arrangements, especially for their integration, to decrease the number of calculations to be performed per second as much as possible.

Figure 7:
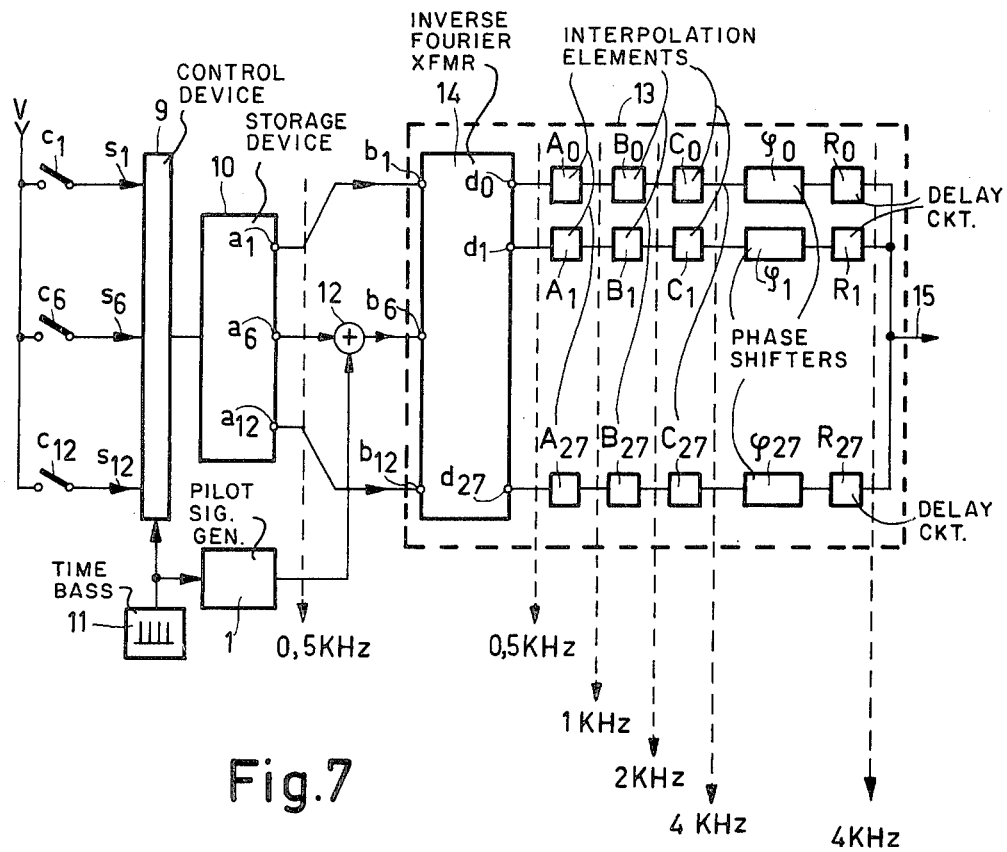
Figure 8:
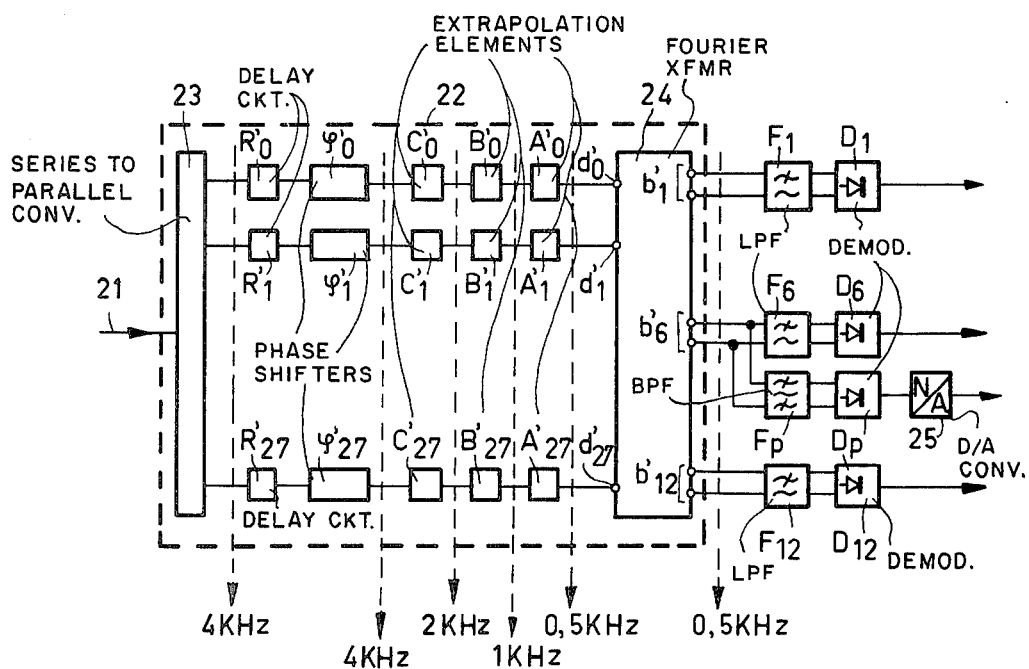

FIGS. 7 and 8 respectively show a variant of the FDM modulation and FDM demodulation arrangement of FIGS. 1 and 2 with which a considerable decrease in the number of calculations per second is obtained. In these FIGS. 7 and 8 elements corresponding with FIG. 1 and FIG. 2 respectively are indicated with the same reference numerals. For a proper understanding of the arrangements shown in FIG. 7 and FIG. 8 it should be noted that the sampling frequency of the baseband auxiliary signals may be much lower than 4 kHz. For, the highest frequency which occurs in these auxiliary signals is not much higher than 50 Hz for the signalling signals whilst the pilot signal has a frequency of 140 Hz or 80 Hz. In the arrangement shown in the FIGS. 7 and 8 the sampling frequency of the auxiliary signals is 500 Hz.

In the FDM modulation arrangement shown in FIG. 7 digital signals are applied to the inputs $b_1$ to $b_{12}$ inclusive of the inverse Fourier transformer 14 with a sampling frequency of 0.5 kHz. This computing device performs inverse Fourier calculations at a rate of 0.5 kHz. Consequently at the outputs $d_0$ to $d_{27}$ inclusive of the Fourier transformer digital signals are produced with a sampling frequency of 0.5 kHz. The output signals of the Fourier transformer 14 are thereafter each applied to an interpolating digital filter to increase the sampling frequency. This interpolating filter is constructed in the manner as described in detail in U.S. Pat. No. 3,928,755 and in particular comprises three interpolation elements connected in cascade, $A_0$ to $A_{27}$ inclusive, $B_0$ to $B_{27}$ inclusive, $C_0$ to $C_{27}$ inclusive. Each interpolation element is a digital filter which is called half-bandpass filter in the said U.S. Pat. No. 3,928,755. As indicated in said patent a half-bandpass filter must be understood to mean a low-pass filter having a cut-off frequency which is equal to half the input sampling frequency and which is arranged for supplying a digital signal having an output sampling frequency which is equal to twice the input sampling frequency. FIG. 7 shows the various sampling frequencies which occur at different points in the circuit. More in particular the sampling frequency at the outputs of the elements $A_0$ to $A_{27}$ inclusive is 1 kHz; this frequency is 2 kHz at the outputs of the elements $B_0$ to $B_{27}$ inclusive and 4 kHz at the outputs of the elements $C_0$ to $C_{27}$ inclusive. The digital signals at the outputs of the interpolation elements $C_0$ to $C_{27}$ inclusive are applied to the same branches of the polyphase network as in FIG. 1, these branches being constituted by the digital phase shifters $\varphi_0$ to $\varphi_{27}$ inclusive with which the delay circuits $R_0$ to $R_{27}$ inclusive are connected in series. These phase shifters and these delay circuits have exactly the same characteristics as that of FIG. 1 and, as in FIG. 1 the speed of computing in the phase shifters is 4 kHz. The same FDM signal is obtained at the output 15 as with the arrangement of FIG. 1.

In the FDM demodulation arrangement of FIG. 8 the digital filter bank 22 comprises, as in FIG. 2 at the outputs of the series-parallel converter 23 the same polyphase network branches which are each provided with a series circuit of an $R'_0$ to $R'_{27}$ inclusive and a digital phase shifter $\varphi'_0$ to $\varphi'_{27}$ inclusive. The input sampling frequency of the delay circuits $R'_0$ to $R'_{27}$ inclusive and the output sampling frequency of the phase shifters $\varphi'_0$ to $\varphi'_{27}$ inclusive is 4 kHz. The outputs of the phase shifters $\varphi'_0$-$\varphi'_{27}$ are connected to the inputs of sampling frequency reduction filters. The latter filters which are also called "extrapolating" or "decimation" filters are constructed in a manner as described in detail in said U.S. Pat. No. 3,928,755. More in particular also now each of these filters comprises three elements $C'_0$ to $C'_{27}$ inclusive, $B'_0$ to $B'_{27}$ inclusive, $A'_0$ to $A'_{27}$ inclusive, connected in cascade. In said U.S. Pat. No. 3,928,755 each of these elements is indicated as half-bandpass dividing filter. The term half-bandpass dividing filter must be understood to mean a low-pass filter having a cut-off frequency which is equal to one fourth of the input sampling frequency and which is arranged for producing a digital signal with an output sampling frequency which is half that of the input sampling frequency. As indicated in FIG. 8 the output sampling frequency of the elements $C'_0$ to $C'_{27}$ inclusive is 2 kHz. The output sampling frequency of the elements $B'_0$ to $B'_{27}$ inclusive is also here 1 kHz and the output sampling frequency of the elements $A'_0$ to $A'_{27}$ inclusive is 0.5 kHz. Now the Fourier transformer 24 is operated at a rate of 0.5 kHz and at the pairs of outputs $b'_1, \ldots, b'_{12}$ of this Fourier transformer 24 the sampling frequency is 0.5 kHz. The selection filters $F_1 - F_{12}$ for the signalling signals and the selection filter $F_p$ for the pilot signal are now operated with a rate of 0.5 kHz.

With respect to the arrangements indicated in the FIGS. 1 and 2 the arrangements of the FIGS. 7 and 8 comprise as additional material the interpolation elements A B C and the extrapolation elements C' B' A'. As indicated in said U.S. Pat. No. 3,928,755 these elements may be realized in a particularly simple manner. In particular each element can be constructed from a single multiplier and two stores which constitute two delay circuits. However, as appears from the sampling frequencies indicated in various places in the FIGS. 7 and 8 a considerable decrease (by a factor 8) has now, however, been realised in the speed at which calculations in the two Fourier transformers 14 and 24 and in the separating filters $F_1$ to $F_{12}$ and $F_p$ must be performed. Furthermore these separating filters may be less complex. The separating filters for the signalling signals, for example, may be realized with a single second order recursive digital filter instead of with a cascade circuit of two second order recursive digital filters. It is possible to prove that in the arrangements of the FIGS. 7 and 8 with respect to the arrangements of the FIGS. 1 and 2 a decrease in the number of calculations per second (mainly multiplications) by a factor of approximately 4 can be realized whilst the required number of stores is only increased by approximately a factor of 2.

Figure 9A:
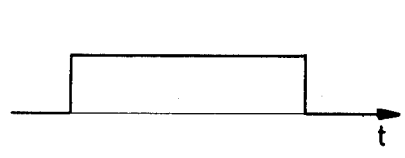
Figure 9B:
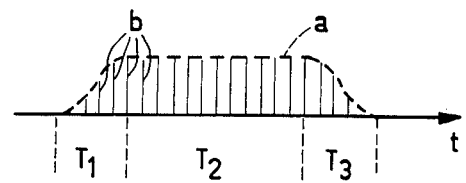

To explain the operation of the control device 9 and the store 10 FIG. 9a shows a pulse of a signalling signal. These pulses occur at a frequency of 10 Hz. The purpose of the control device 9 and the store 10 is to convert the pulse shown in FIG. 9a into a series of binary coded samples which occur at a sampling frequency of 4 kHz or 0.5 kHz and which characterize the filtered version of this pulse. More in particular, in the described embodiments the pulses are filtered by means of a filter which has a cut-off frequency of 50 Hz. The filtered version of this pulse is shown in FIG. 9b by means of the dashed curve a. Furthermore, FIG. 9b shows a number of samples of this filtered pulse, four of these samples having been indicated by b.

Figure 10:
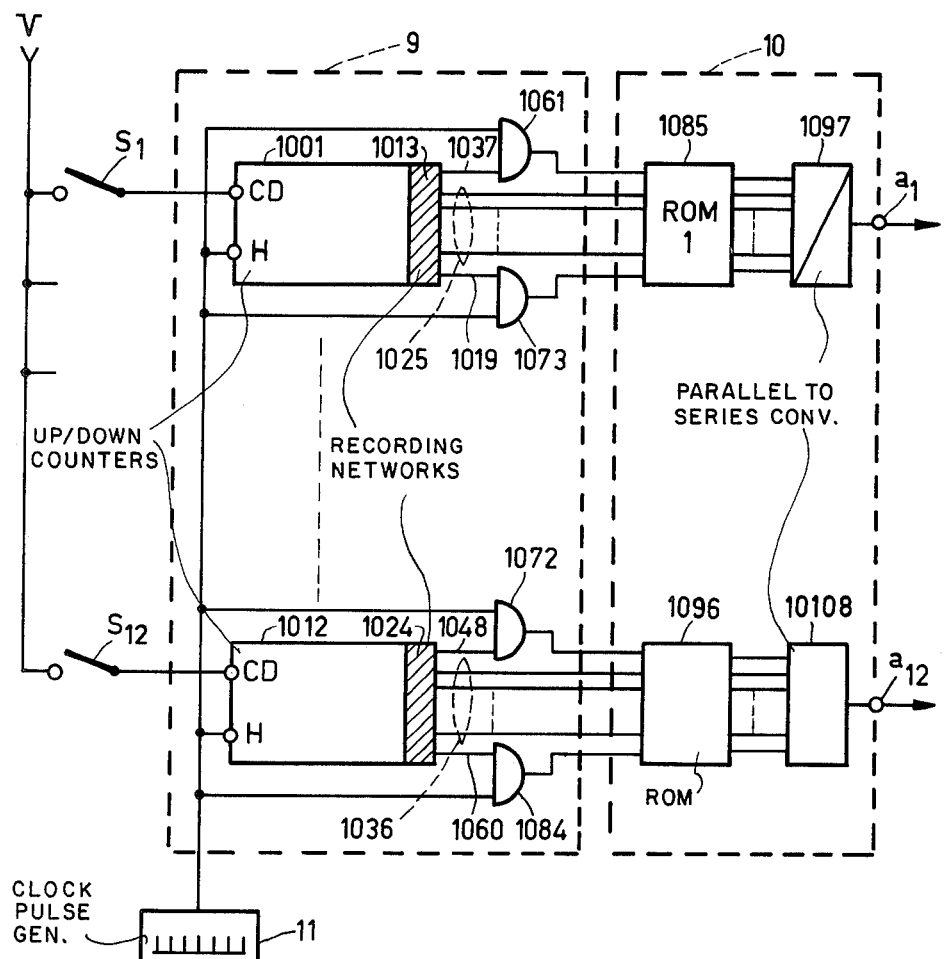

FIG. 10 shows an embodiment of the control device 9 and the store 10. In this embodiment the control device 9 comprises twelve input leads through which the signalling signals $s_1 - s_{12}$ are applied to the device 9. Each input lead comprises a two way counter 1001 – 1012 which are each provided with an input CD and an input H. The relevant signalling signal is applied to the input CD and clock pulses are applied to the input H said clock pulses being produced by the clock pulse generator 11. If a signalling pulse is present at the input CD of a two-way counter the clock pulses applied to the input H are counted until the counter has reached its maximum position whereafter any additionally applied clock pulse does not change the counter position. If at a given moment the signalling pulse at the input CD of the counter disappears then, owing to the clock, pulses then occurring, the counter counts down till it has reached its minimum counter position whereafter any further clock pulse cause no change in the counter position anymore. The clock pulse generator 11 produces pulses with the desired sampling frequency; so with a frequency of 4 kHz or 0.5 kHz.

A decoding network is associated with each of the counters 1001 – 1012. In FIG. 10 these networks are indicated by means of the hatched areas 1013 – 1024, the outputs 1025 – 1036 of which are applied to the store 10. At these outputs a code word in parallel form is produced which is characteristic for the counter position. The decoding networks 1025 – 1036 are furthermore each provided with an output 1037 – 1048 at which a pulse is produced if the counter has reached its lowest counter position and with an output 1049 – 1060 at which a pulse is produced if the counter has reached its maximum counter position. These outputs are connected to inputs of the store 10 through AND-gates 1061 – 1072 and through AND-gates 1073 – 1084. Also the clock pulses of the clock pulse generator 11 are applied to these AND-gates 1061 – 1084.

In this embodiment the store 10 is constituted by twelve storage elements 1085 – 1096, each in the form of a ROM. Each of these storage elements is associated in the manner shown in the Figure to one of the counters 1001 – 1012. If it is assumed that the counters 1001 – 1012 each need N clock pulses to arrive from the minimum into the maximum counter position or vice versa then, in each of the storage elements 1085 – 1095 N code words are stored which each characterize a sample of the unit step response of the desired low-pass filter having a cut-off frequency of 50 Hz. As a result of each of the code words produced by a decoding network a code word is read in parallel form from the associated storage element and applied for parallel-to-series conversion to a parallel-series converter 1097 – 10108 which is provided with the outputs $a_1 - a_{12}$.

The operation of the arrangement shown in FIG. 10 is as follows. If a contact, for example $C_1$ is closed at an instant that the counter 1001 has the minimum counter position (for example the position 0) then the counter counts N clock pulses and reaches its maximum counter position. When counting these N clock pulses the counter passes through N different counter positions. As a result of each of these counter positions the storage element 1085 produces a code word which corresponds to a sample of the filtered pulse in the period of time $T_1$ indicated in FIG. 9b. If, the maximum counter position is reached and the contact $C_1$ remains closed, the counter 1001 remains in its maximum counter position, the storage element 1085 produces, as a result of the output pulses of the AND-gate 1073, in the period of time $T_2$ (see FIG. 9b) code words which characterize the maximum amplitude of the filtered signalling pulse. If the contact $C_1$ is opened after the period $T_2$ then the counter 1001 counts down until it reaches its minimum counter position. In the time $T_3$ (see FIG. 9b) required for this purpose the storage element 1085 supplies the same code words as in the period $T_1$, however, in reversed sequence. After the minimum counter position (the zero position) is reaches the storage element 1085 no longer produces code words.

It should be noted that although in the embodiment of FIG. 10 the store 10 is constituted by twelve separate storage elements a single storage element will do. For all twelve storage elements contain the same code words. This single storage element may then be operated by means of "time sharing" techniques.

What is claimed is:

1. An arrangement for processing spatially separated auxiliary signals for a given number of main information signals for transmitting these auxiliary signals together with the main information signals in an FDM format, said arrangement comprising a plurality of input circuit means for receiving said auxiliary signals, which plurality is equal to the number of main information signals, an output circuit, wherein the arrangement further comprises:
    means coupled to said input means for digitizing the auxiliary signals, whereby said digital signals have a given bandwidth;
    means which are coupled to said digitizing means for limiting the bandwidth of each of the auxiliary signals to less than said given bandwidth; and
    a digital filter bank coupled to said limiting means and to said output means to which said digital auxiliary signals are applied and which has a passband characteristic which is characteristic for each of the auxiliary signals, the intermediate frequency of this characteristic coinciding with the intermediate frequency of the auxiliary channel for the relevant auxiliary signal.

2. An arrangement for processing auxiliary signals of a given number of main information signals and for spatially separating and recovering these signalling signals which are applied to the arrangement together with the main information signals in an FDM format, said arrangement comprising an input circuit means for receiving said signals to said FDM format having a plurality of output circuits which is equal to the number of main information signals, the arrangement furthermore comprises:
    means coupled to said input means for digitizing the FDM signal,
    a first digital filter bank to which said digitized FDM signal is applied and which has a bandpass characteristic which is characteristic for each of the signalling signals, the intermediate frequency of one of the passbands coinciding with the intermediate frequency of the relevant auxiliary channel; and
    a second digital filter bank to which the digital output signals of the first digital filter bank are applied and which has a low-pass characteristic for each of the auxiliary signals.

3. An arrangement as claimed in claim 1, wherein the means for digitizing the auxiliary signals produces output code words with a sampling frequency which is smaller than the frequency interval between the main information signals in the FDM format.

4. An arrangement as claimed in claim 1, wherein said digital filter bank comprises an inverse discrete Fourier transformer having a plurality of parallel outputs, and a polyphase network having a plurality of inputs coupled to said outputs respectively and an output coupled to the output circuit of the arrangement.

5. An arrangement as claimed in claim 4, wherein the polyphase network comprises a plurality of channels which are equal in number to the plurality of outputs of said Fourier transformer, each of these channels including a series arrangement of a digital phase shifting network and a digital delay device, the outputs of these delay devices being coupled to the output of the polyphase network.

6. An arrangement as claimed in claim 5, further comprising a plurality of interpolating digital filters disposed between each of the outputs of the Fourier transformer and the corresponding input of the polyphase network respectively.

7. An arrangement as claimed in claim 1, wherein the auxiliary signals comprise signalling signals and said means for limiting the bandwidth of the signalling signals has a plurality of output channels which correspond to the plurality of signalling signals, the arrangement further comprising a pilot signal generator means for producing a digital pilot signal and in which one of the output channels of said limiting means comprises a digital adder means for adding the pilot signal to the signalling signal produced at the relevant output.

8. An arrangement as claimed in claim 2, wherein said first digital filter bank comprises a series-to-parallel converter having a plurality of output channels which is at most twice as large in number as the plurality of main information signals in the FDM signal, and a polyphase network coupled to said output channels.

9. An arrangement as claimed in claim 8, wherein said polyphase network comprises a plurality of series arrangements including a digital delay circuit and a digital phase shifting network coupled in each of the output leads of the series-to-parallel converter respectively.

10. An arrangement as claimed in claim 9, wherein said first digital filter bank comprises a discrete Fourier transformer having inputs coupled to said output channels of the series-to-parallel converter and a plurality of output circuits which are equal in number to the plurality of main information signals in the FDM signal and which are coupled to inputs of the second digital filter bank.

11. An arrangement as claimed in claim 10, wherein said second digital filter bank has a plurality of channels each comprising a digital filter, an input of each of said channels being coupled to an output circuit of the Fourier transformer.

12. An arrangement as claimed in claim 9, further comprising a plurality of sampling frequency reduction extrapolating digital filters included in each of the output leads of the series-to-parallel converter in series with said phase shifting network respectively.

13. An arrangement as claimed in claim 11, further comprising a second digital filter means coupled to at least one of the output circuits of the Fourier transformer for selecting a pilot signal which is co-transmitted in the FDM signal.

* * * * *